United States Patent [19]

Yamada et al.

[11] Patent Number: 4,994,417

[45] Date of Patent: Feb. 19, 1991

[54] SINTERED SILICON CARBIDE ARTICLES

[75] Inventors: Koichi Yamada; Masahide Mouri, both of Niihama; Yoshisaburo Nomura, Uma, all of Japan

[73] Assignee: Sumitomo Aluminum Smelting Company, Limited, Osaka, Japan

[21] Appl. No.: 476,139

[22] Filed: Feb. 7, 1990

Related U.S. Application Data

[63] Continuation-in-part of Ser. No. 247,066, Sep. 20, 1988, abandoned, which is a continuation-in-part of Ser. No. 716,152, Mar. 26, 1985, abandoned.

[30] Foreign Application Priority Data

Mar. 26, 1984 [JP]  Japan .................................. 59-57584

[51] Int. Cl.$^5$ .............................................. C04B 35/56
[52] U.S. Cl. ...................................................... 501/90
[58] Field of Search ............................................ 501/90

[56] References Cited

U.S. PATENT DOCUMENTS

| Re. 30,286 | 5/1980 | Coppole et al. | 501/92 |
| 4,312,954 | 1/1982 | Coppola et al. | 501/90 |
| 4,372,902 | 2/1983 | Denton et al. | 501/88 |

FOREIGN PATENT DOCUMENTS 56-155071  12/1981  Japan ..................................... 501/90

Primary Examiner—Mark L. Bell
Attorney, Agent, or Firm—Wenderoth, Lind & Ponack

[57] ABSTRACT

The invention relates to a method for producing a sintered silicon carbide article having a sintered density of at least 90% of the theoretical density and a mechanical flexural strength of 50 kg/mm$^2$ or higher. This is achieved by adding to a finely divided $\alpha$-type silicon carbide powder, a tar pitch in such amounts as to provide 4.2–6 parts by weight of carbon after carbonization and a boron compound such as to correspond to a boron content of 0.005–0.15 parts by weight as densification aids, mixing and shaping the resulting mixture, and then sintering the thus-shaped article in an inert atmosphere at a temperature of from 1950° to 2300° C.

1 Claim, No Drawings

SINTERED SILICON CARBIDE ARTICLES

This is a continuation-in-part of Ser. No. 07/247,066, filed Sept. 20, 1988, now abandoned which in turn is a continuation-in-part of U.S. patent application Ser. No. 716,152 filed Mar. 26, 1985, now abandoned.

The present invention relates to a method for producing a sintered silicon carbide article high in sintered density, mechanical strength and corrosion resistance, and more particularly to a method for producing a sintered silicon carbide article having a high sintered density, high mechanical strength and high corrosion resistance by mixing a finely divided silicon carbide powder with a definite amount of a specific carbon-containing material and a boron compound as densification aids, shaping and then sintering said shaped article under an inert atmosphere.

A sintered silicon carbide article has excellent physical and chemical properties, and, in particular, has high hardness and excellent corrosion resistance and its mechanical properties do not change at a high temperature as compared with those at a normal temperature. Therefore, a sintered silicon carbide article has been regarded as promising as a wear resistant material and as a high-temperature structural material. However, as silicon carbide is hard to sinter, it is difficult to sinter it into a sintered article having a high sintered density by a usual method. Therefore, a sintering method by a hot press method and a sintering method by using densification aids have been proposed.

For example, in Japanese Patent Laid-Open No. 148712/1976, it was disclosed that a sintered silicon carbide article having a high sintered density is produced by mixing 91–99.35 parts by weight of α-type silicon carbide powder having a specific surface area of 1–100 m$^2$/g with 0.67–20 parts by weight of a carbonizable, organic solvent-soluble organic material having a carbonization ratio of 25–75% by weight, a definite amount of a boron compound containing 0.15–3.0 parts by weight of boron component and 5–15 parts by weight of a binding agent which is consumed under sintering conditions, and then the resulting mixture is sintered.

Further, in U.S. Pat. No. 4,123,286, there is disclosed a silicon carbide powder containing:
(a) from about 5 to about 100% by weight of alpha crystalline phase silicon carbide,
(b) a maximum of the following components in % by weight:

| | |
|---|---|
| SiO$_2$ | 2.00 |
| free silicon | 0.25 |
| iron | 0.50 |
| alkali and alkaline earth metal | 0.50 |
| total metal oxides | 3.75 |

(c) the particles in said powder having an average particle size from about 0.10 to about 2.50 microns,
(d) said powder characterized by the property of being sinterable under substantially pressureless conditions at a temperature between about 1950° C. and about 2500° C. when mixed with between about 0.05 and about 4.0% by weight of combinable carbon and from about 0.03 to about 3.0% by weight of a densification aid, and it is mentioned that such powder can be sintered by usual sintering operations to obtain a high density, high strength product.

However, although a sintered silicon carbide article having a high sintered density is obtained by any of the above mentioned methods, the mechanical strength of the sintered article is not always satisfactory and, for example, a sintered silicon carbide article having a flexural strength exceeding 50 kg/mm$^2$ could not be obtained by the known methods.

Under these circumstances, the present inventors have made extensive studies to find a method for producing a sintered silicon carbide article having a high sintered density and which is excellent in mechanical properties. As a result, it has been found that, a sintered silicon carbide article satisfying all the above-mentioned requirements can be obtained by mixing a finely divided silicon carbide powder with a definite amount of a special carbonaceous component combined with a boron compound in an amount less than the amount of boron component conventionally required to increase the sintered density of a sintered silicon carbide article, shaping and then sintering the shaped article. That is, according to the present invention, a sintered silicon carbide article having excellent mechanical properties and corrosion resistance can be obtained without lowering the desirable sintered density of the article.

In accordance with the present invention, there is provided a method for producing a sintered silicon carbide article excellent in mechanical properties and corrosion resistance and having a sintered density of at least 90% of the theoretical density and a flexural length of at least 50 kg/mm$^2$ which comprises the steps of adding a tar pitch in such an amount as to provide 4.2–6 parts by weight of carbon after being carbonized and a boron compound in such an amount as to correspond to 0.03–0.15 parts by weight of boron content as densification aids to 100 parts by weight of a finely divided α-silicon carbide powder. The mixture is then shaped and sintered in an inert atmosphere at a temperature of from 1900° to 2300° C.

The present invention will be explained in detail hereinafter.

In the present invention, as a finely divided silicon carbide powder, it is suitable to employ a silicon carbide powder having an average particle size of 1 micron or less and consisting essentially of silicon carbide having mainly α crystals of noncubic polytypes. This silicon carbide generally contains 0.2–2% by weight of free carbon, but the starting material of the present invention is also the same.

In the present invention, a tar pitch in such an amount as to provide 4.2–6 parts by weight of carbon after being carbonized and a boron compound in such an amount corresponding to 0.03–0.15 parts, preferably 0.05–0.14 parts, more preferably 0.05–0.13 parts most preferably 0.08–0.13 parts by weight of boron content are added to and mixed with 100 parts by weight of a silicon carbide powder. If the amount of tar pitch is less than 4.2 parts by weight as carbon after being carbonized, it is impossible to obtain a sintered silicon carbide article having a high sintered density and mechanical strength required for desired use such as for mechanical parts. On the other hand, if the amount of a tar pitch exceeds the upper limit, the mechanical strength of the sintered article lowers, so that an improvement in mechanical properties can not be attained.

Further, if the amount of boron compound is less the amount corresponding to 0.03 parts by weight of boron content based on 100 parts by weight of a silicon carbide powder, it is impossible to obtain a sintered article having a high sintered density, so that such an amount is not suitable. On the other hand, if the amount of boron compound exceeds the upper limit, it is possible to obtain a sintered article having a high sintered density, but the mechanical strength and corrosion resistance of the sintered article are lowered unfavorably, so that the object of the present invention can not be attained.

The tar pitch used in the invention is a commercial coal or oil pitch coke and preferred to use an organic solvent-soluble coal tar pitch or oil tar pitch having a carbonization ratio of 40-60% by weight. Further, the boron compound used in the invention is not specified but it is preferred to use such a boron compound as to be able to be stable up to a sintering temperature for the present invention and, to be concrete, as preferred boron compounds, boron, boron carbide, and the like are exemplified.

In the present invention, the above mentioned amounts of silicon carbide powder, boron compound and tar pitch are mixed uniformly using an organic solvent such as benzene, quinoline, anthracene, or the like or water and then the resulting mixture is shaped by a known slip casting method, or the resulting mixture is spray dried to obtain the mixture granules, which are then press-molded into the objective article by a known method. As the other molding method, the starting materials comprising a silicon carbide powder, a boron compound and a tar pitch are admixed uniformly with an organic binder or water and then the admixture is molded into a shaped article by a known extrusion molding, injection molding or the like. If desired, the thus shaped article is subjected to a machining step or to treatment to remove the binder. As regards the sintering conditions, the article shaped to a desired form is sintered in an inert atmosphere such as argon, helium, nitrogen or the like at a temperature of from 1900°–2300° C., preferably 2050°–2300° C., most preferably 2050°–2250° C. for a period of time from 10 minutes to 10 hours. When the sintering temperature is lower than 1900° C., particularly below 2050° C. the resulting sintered article has a low sintered density, and when the sintering temperature exceeds 2300° C., the evaporation of silicon carbide and the coarse growth of crystal grains occurs and the resulting sintered article has a low mechanical strength, so that such a high sintering temperature is not preferred.

It is not fully understood why it is possible to obtain a sintered article having a high sintered density and excellent mechanical strength. However, as a result of investigating sintered articles by analytical experiments, it has been found that the tar pitch used in the invention is converted into carbon in the process of sintering, although a high molecular aromatic compound such as a phenol resin, a polyphenylene resin or the like, or a carbon-containing organic compound such as an aromatic hydrocarbon is, in general, converted through a solid phase state into a structurally unoriented carbon. It is assumed that, due to the different characteristics of tar pitch as mentioned above, the growth of crystal grains of silicon carbide is restrained and the oxide layer on the surface of the shaped article is removed smoothly in the process of calcining at a temperature of 1200° C. or higher. As the result, the sintering takes effect in the presence of smaller amount of boron as a densification aid than that in the conventional method when the shaped article of silicon carbide is sintered at a sintering temperature of 1900° C. or higher, so that the improvement in mechanical strength without causing adverse affect in respect to the sintering density. It is also believed that, by decreasing the amount of boron, there is obtained an effect of improving the corrosion resistance.

In the above, according to the present invention, it has become possible to produce a high-density, high-strength and high corrosion-resistant sintered silicon carbide article having a sintered density of at least 90%, preferably 95% or more of the theoretical density of the sintered article and a mechanical strength (flexural strength) of 50 kg/mm$^2$ or higher, preferably 55 kg/mm$^2$ or higher by using tar pitch and boron compound in the specified amounts as densification aids. Thus, the present invention has great industrial significance for the production of materials suitable as wear-resistant material for producing mechanical seals, bearings, etc. and as heat-resistant material for producing gas turbines, heat-exchangers, etc.

The present invention is further described in detail below according to an example, which is not, however, limitative of the present invention.

EXAMPLE 1

After 10 g. of coal tar pitch (having a carbon yield of 45% (by weight after being carbonized)) was dissolved in 15 g. of quinoline, 200 g. of benzene was added to the solution and was mixed sufficiently. To the solution, 100 g. of α-type silicon carbide having a silicon carbide content of 96% by weight and a BET specific surface area of 9 m$^2$/g. and 0.15 g. of boron carbide powder passing through 1200 mesh were added and they were mixed with and dispersed in the solution using a plastics ball mill for 3 hours. The dispersion was dried at 60° C. in a nitrogen gas stream and the resulting powder was pulverized and then sieved with a 180 mesh screen. Then, after the thus obtained pulverized mixed powder was cold pressed, it was charged into a rubber mold and subjected to hydrostatic pressure press compacting under compacting pressure of 2 tons/cm$^2$ to prepare a green shaped article having dimensions of 50×30×4 mm.

After the said article was calcined at 600° C. for 3 hours in an argon gas stream, it was further sintered at 2050° C. for 30 minutes in an argon gas atmosphere. The thus obtained sintered article had a sintered density of 3.14 g/cm$^3$ and 3 point flexural strength of 60 kg/mm$^2$.

COMPARATIVE EXAMPLE 1

9 g. of novolak type phenol resin (having a carbon yield of 50% by weight) was dissolved in 200 g. of benzene. Then 100 g. of α-type silicon carbide having a silicon carbide content of 96% by weight and a BET specific surface area of 9 m$^2$/g. and 0.15 g. of boron carbide powder passing through 1200 a mesh were added to the solution, and the materials were mixed with and dispersed in the solution for 3 hours. The dispersion was dried at 60° C. in a nitrogen gas stream and after the dried powder was pulverized, it was sieved with a 180 mesh screen. After the obtained pulverized mixed powder was cold pressed, it was charged in a rubber mold and then subjected to hydrostatic pressure press compacting under compacting pressure of 2 tons/cm$^2$ to prepare a green article having dimensions of 50×30×4 mm.

After the green article was calcined at 600° C. for 3 hours in an argon gas stream, it was further sintered at 2050° C. for 30 minutes in an argon gas atmosphere. The thus obtained sintered article had a sintered density of 2.90 g/cm³ and 3 point frexural strength of 30 kg/mm².

EXAMPLE 2

The procedure of Example 1 was repeated except that the amount of boron carbide was varied. The results of sintered density and flexural strength measurements and microstructure observation of the resulting article are shown in Table 1.

COMPARATIVE EXAMPLES 2–7

The procedure of Example 1 was repeated except that the amount of boron carbide, amount of coal tar pitch and/or sintering temperature were varied as indicated in Table 1. The results of sintered density and flexural strength measurements and microstructure observation of the resulting articles are shown in Table 1.

EXAMPLE 3

100% by weight of α-type silicon carbide powder (Lonza UF-10) having a BET specific surface area of 10 m²/g and a purity of about 99 wt. % (free carbon 0.34 wt. %. Si 0.05 wt. %, other oxides 0.6 wt. %), 0.15 parts by weight of boron carbide $B_4C$ powder (Denki Kagaku) having an average particle diameter of about 3μ, a quinoline solution of a coal tar pitch (a char yield of 53% by weight) and 200% by weight of a 0.25 wt. % aqueous solution of polyvinyl alcohol were mixed in a plastic ball mill for 5 hours and the suspension was spray-dried. The mixture was shaped into an article of 50×35×5 mm by isostatic pressing under a pressure of 1.5 ton/cm². The shaped article was sintered in a graphite resistance furnace, wherein the temperature was increased up to 1800° C. at a rate of 450° C./hr. under a reduced pressure of 0.01 Torr, further from 1800° C. to 2125° C. at a rate of 50° C./hr. in an argon atmosphere (1 atm.) and finally the temperature of 2125° C. was maintained for 2 hours. The sintered density and flexural strength of the thus obtained sintered article are shown in Table 1.

EXAMPLES 4–9

The procedure of Example 3 was repeated except that the amount of boron carbide, amount of coal tar pitch and/or sintering temperature were varied as indicated in Table 1. The results of sintered density and flexural strength measurements and microstructure observation of the resulting sintered articles are shown in Table 1.

COMPARATIVE EXAMPLES 8–13

The procedure of Example 3 was repeated except that the amount of boron carbide, amount of coal tar pitch and/or sintering temperature were varied as indicated in Table 1. The results of sintered density and flexural strength measurements and microstructure observation of the resulting sintered articles are shown in Table 1.

TABLE 1

| | Silicon carbide BET(m²/g) | Boron carbide (parts by wt.) | Coal tar pitch (parts by wt.) | Sintering conditions | Sintered density (g/cm³) | Flexural strength (kg/mm²) | Microstructure |
|---|---|---|---|---|---|---|---|
| Example 2 | 9 | 0.1 | 10 | 2050° C. × 0.5 h | 3.14 | 65 | Normal grain growth |
| Comparative Example 2 | 9 | 0.2 | 10 | 2050° C. × 0.5 h | 3.13 | 40 | Normal grain growth |
| Comparative Example 3 | 9 | 0.02 | 10 | 2050° C. × 0.5 h | 2.80 | 30 | Normal grain growth |
| Comparative Example 4 | 9 | 0.1 | 14 | 2050° C. × 0.5 h | 3.08 | 45 | Normal grain growth |
| Comparative Example 5 | 9 | 0.1 | 3 | 2050° C. × 0.5 h | 2.60 | 25 | — |
| Comparative Example 6 | 9 | 0.1 | 10 | 1800° C. × 0.5 h | 2.40 | 20 | — |
| Comparative Example 7 | 9 | 0.1 | 10 | 2350° C. × 0.5 h | 3.00 | 30 | Exaggerated grain growth |
| Example 3 | 10 | 0.15 | 8.5 | 2125° C. × 2 h | 3.17 | 63 | Normal grain growth |
| Example 4 | 10 | 0.15 | 8.5 | 2200° C. × 2 h | 3.17 | 63 | Normal grain growth |
| Example 5 | 10 | 0.15 | 9 | 2125° C. × 2 h | 3.17 | 64 | Normal grain growth |
| Example 6 | 10 | 0.15 | 11 | 2125° C. × 2 h | 3.15 | 53 | Normal grain growth |
| Example 7 | 10 | 0.15 | 8.5 | 1950° C. × 2 h | 2.95 | 50 | Normal grain growth |
| Example 8 | 16 | 0.15 | 8.5 | 2125° C. × 2 h | 3.13 | 63 | Normal grain growth |
| Example 9 | 16 | 0.15 | 8.5 | 2200° C. × 2 h | 3.15 | 62 | Normal grain growth |
| Comparative Example 8 | 10 | 0.15 | 3.9 | 2125° C. × 2 h | 1.75 | 7 | — |
| Comparative Example 9 | 10 | 0.15 | 4.8 | 2125° C. × 2 h | 1.75 | 7 | — |
| Comparative Example 10 | 10 | 0.15 | 5.5 | 2125° C. × 2 h | 2.40 | 21 | — |
| Comparative Example 11 | 10 | 0.15 | 6.5 | 2125° C. × 2 h | 3.08 | 47 | Exaggerated grain growth |
| Comparative Example 12 | 10 | 0.5 | 8.5 | 2125° C. × 2 h | 3.17 | 44 | Normal grain growth |
| Comparative Example 13 | 10 | 0.5 | 8.5 | 2200° C. × 2 h | 3.16 | 35 | Exaggerated grain growth |

COMPARATIVE EXAMPLE 14

Thus 96.7 parts by weight of β-type silicon carbide powder (IBIDEN Ultra Fine) of a purity of about 99.2% ($SiO_2$ 0.23 wt. %, free carbon 0.42 wt. %, Al 0.03 wt. %, Fe 0.06 wt. %, othe impurities less than 0.06 wt. %) and average particle diameter 0.28 μm, 0.2 wt. part of boron powder of an average particle diameter of 0.2 μm, 3.0 wt. parts of carbon black (ASAHI THERMAL) of an average particle diameter of 0.1 μm and 0.1 wt. part of polyvinyl alcohol (as binder) are mixed and then added with 150 wt. parts of water. The whole was mixed in a plastic ball mill for 60 minutes and then dried at 80° C. for 24 hours. The dried product was pulverized by the use of a mortar and the powder was shaped into an article of 20 mm × 4 mm$^l$ by isostatic pressing under a pressure of 1.5 ton/cm$^2$. The article was sintered in a graphite resistance furnace, wherein the temperature was increased up to 1800° C. at a rate of 450° C./hr. under a reduced pressure of 0.01 Torr, further up to 2100° C. at a rate of 50° C./hr. in an argon atmosphere (1 atm.) and the temperature of 2100° C. was maintained for 2 hours.

The resulting sintered article has a density of 2.80 g/cm$^2$ (about 87% of theoretical density), flexural strength of 35 kg/mm$^2$ and boron content of 0.16 wt. %.

COMPARATIVE EXAMPLE 15

The procedure of Comparative Example 14 was repeated except that the amount of the silicon carbide powder was 96.78 parts by weight and the amount of boron powder was 0.12 parts by weight.

The resulting sintered article had a density of 2.56 g/cm$^3$ (about 80% of theoretical density), flexural strength of 29 kg/mm$^2$ and boron content of 0.11 wt. %.

EXAMPLE 10

In the flasks containing the solutions shown in Table 2 the sintered articles obtained in Example 3 and Comparative Example 12 were immersed, and each flask was left stand in a thermostatic vessel at 80° C. for 83 hours, and then the weight loss of the sintered article was measured to evaluate the corrosion-resistance. The results are shown in Table 2.

TABLE 2

| Sample | 50% NaOH (mg/dm$^2$.day) | 98% $H_2SO_4$ (mg/dm$^2$.day) |
|---|---|---|
| Example 3 | 0.36 | 0.18 |
| Comparative Example 12 | 0.86 | 0.42 |

As shown in Table 1 and 2, it is clear that silicon carbide sintered articles prepared by the method of the invention have high mechanical strength, high corrosion resistance and high sintered density as compared with the sintered articles by the conventional method.

What is claimed is:

1. A sintered silicon carbide article having a sintered density of at least 95% of the theoretical density and a mechanical flexural strength of about 50 kg/mm$^2$ or higher, said sintered silicon carbide article being produced according to a process comprising the steps of adding a tar pitch in such an amount to provide about 4.2 to about 6 parts by weight of carbon after being carbonized and a boron compound in such an amount as to correspond to a content of 0.05-0.13 parts by weight of boron as densification aids to 100 parts by weight of a finely divided α-type silicon carbide powder and mixing and shaping the resulting mixture, and then sintering the shaped article in an inert atmosphere at a temperature of from about 2050° to about 2300° C.

* * * * *